Oct. 20, 1953 — E. N. HOWELL — 2,655,813

SHEAVE

Filed Aug. 10, 1950

INVENTOR.
Edward N. Howell
BY
L. F. Hammand
Atty.

Patented Oct. 20, 1953

2,655,813

UNITED STATES PATENT OFFICE 2,655,813

SHEAVE

Edward N. Howell, Holmes, Pa.

Application August 10, 1950, Serial No. 178,719

3 Claims. (Cl. 74—230.5)

This invention relates to sheaves, pulleys and the like, and has particular reference to an improved sheave construction formed of relatively inexpensive sheet metal stampings and so designed and constructed that it may be easily, quickly and accurately assembled by spot welding, yet wherein the assembled sheave is more satisfactory in use than previously known types, particularly in that its cable groove is of a unique and improved form which minimizes wear on the cables with which it is used.

It has long been conventional practice to form cable sheaves of a pair of sheet metal stampings having outwardly extending flanges to form the groove of the sheave. The present applicant has learned, however, that the design and construction of such sheaves as have previously been known in the art is such as to cause unnecessarily rapid wear and deterioration on the cables with which the sheaves are used. This is often noted in connection with sheaves designed for use with stranded wire cables by which sectional overhead doors are raised or lowered, since in such applications the cables are often subjected to heavy load and are customarily passed over sheaves of relatively small diameter, where the repeated passage of the same portion of the cable through the groove of the sheave may give rise to unwanted pinching or scraping effects between the wire strands of the cable and the interior surfaces of the sheave groove. This is particularly true with sheaves having V-shaped, cup shaped or wedge type grooves, or having any joint, split or junction in the metal surfaces of the groove at any point which may be contacted by the wire strands of the cable.

It is, therefore, the primary object of the present invention to provide an improved cable sheave, particularly a cable sheave adapted to manufacture of sheet metal stampings, wherein the parts of the sheave are so designed, constructed and assembled that a wire cable running in the groove thereof is not under any circumstances subjected to any wedging, pinching, crimping or scraping action and cannot come into contact with any exposed corners or edges of the metal of the sheave, nor be brought to bear directly on any joint between its assembled metal parts.

According to the present construction, the cable running in the groove of the sheave is guided between side walls substantially parallel with each other, and runs on a load bearing surface which comprises a single, flat, concentric ring extending continuously and uninterruptedly around the entire periphery of the sheave.

A preferred embodiment of the invention, specifically adapted for use in connection with the cables of overhead doors, is illustrated in the drawings hereof, wherein.

Figure 1:
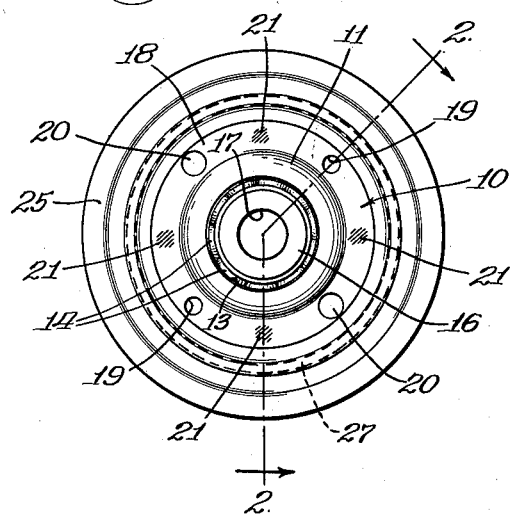
Figure 1 is a side elevational view of a sheet metal sheave constructed in accordance with the present teachings.

As illustrated, the sheave is composed of two side plates generally designated as 10, which may be identical with each other, and are preferably provided with outwardly bulged hub portions 11 having arcuately curved interior surfaces 12 near their center apertures 13 to provide a ball race for anti-friction ball bearings 14 adapted to run in the ball raceway groove 15 of an inner bearing member 16. This member 16 may have a central bore 17 for purposes of mounting, or may be provided with a threaded mounting stud as is conventional with pulleys of this type.

The side plates 10 of the sheave have spider portions 18 extending outwardly from the hub portions 11 and, as shown, these spider portions lie flat against each other and are each provided with a pair of perforations 19 and a pair of locating studs 20. The arrangement is such that when two identical face plates are oppositely disposed and brought together, they may be fitted together by inserting the locating studs 20 of each of the plates in the perforations 19 of the other, so that the plates are automatically centered with respect to each other. They may then be secured together as by spot welding at the points 21, with the assurance that the inner surfaces of the ball race portions 12 and the cable groove of the sheave will be accurately positioned and perfectly concentric.

Figure 2:
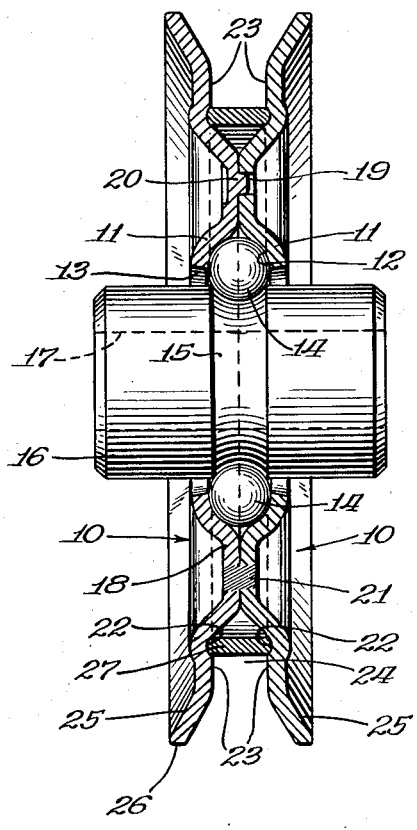
Figure 2 is a detail sectional view thereof, the view being taken substantially on the plane of the line 2—2 of Figure 1.
Figure 3:
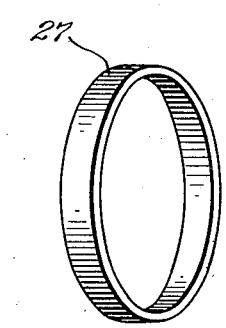
Figure 3 is a perspective view of the annular ring or load bearing member of the sheave, showing the configuration of the smooth, flat, cylindrical face surface which extends continuously therearound.

The plates 10 each include an outwardly offset step portion extending from the spider portions 18 to inwardly facing grooves or indentations 22 from which parallel wall portions 23 extend outwardly to form the sides of the cable groove 24. The walls 23 terminate in outwardly extending flared flanges 25 extending to the rims 26 of the side plates. The parallel walls 23 provide the side surfaces of the sheave groove 24, and the opposed groove 22 serve to support a load member comprising an annular ring or face plate 27 which is inserted in the position shown in Figure 2 before assembly of the other parts.

With this construction, it will be apparent that when a stranded wire cable is run through the groove of the sheave there can be no wedging, pinching, scraping or tight rubbing action, since in use the cable lies loosely between the parallel walls 23, and the only appreciable load of the cable is imposed on the smooth, flat, unbroken surface of the annular ring 27. The joints between this ring and the wall surfaces 23 are at a point where the edges of the metal ring cannot contact the generally circular outer surface of the cable, and since the ring 27 is unbroken and presents a continuously smooth cylindrical surface entirely around the sheave, it follows that a cable passing over the sheave cannot at any time be brought into contact with any exposed metal edges that would cause a biting action on the strands of the cable and thus effect damage or unduly rapid deterioration thereof. Moreover, the sheave illustrated, while having the aforesaid advantages in use, is nevertheless of such design and construction that it may be conveniently manufactured at relatively low cost, and may be quickly, easily and conveniently assembled without the need of any special tools, dies, fixtures or other equipment.

Having thus described my invention, what I claim as new and desire to secure by United States Letters Patent is:

1. As an article of manufacture, a sheet metal sheave having a spider comprising a pair of opposed circular plates each having a pair of projecting studs and a pair of apertures, with the studs of each plate engaging the apertures of the other; said plates being secured directly to each other at a plurality of points in an annular area between the center of the sheave and the rim thereof, with said plates having apertures at their center with oppositely disposed, arcuately shaped hub portions coacting to form a central ball race, and outwardly offset step portions extending to a pair of parallel side walls spaced apart from each other and terminating in outwardly flared diverging flanges at the rim of the sheave, together with a load member comprising a narrow continuous annular ring interposed between said parallel side walls and seated on the outwardly offset step portions of each of said plates, with a smooth, unbroken cylindrical exterior surface on said ring perpendicular to the parallel side walls and coaxial with the axis of rotation of the sheave, whereby a cable running in the groove of said sheave bears only on a smooth, unbroken face surface parallel to the axis of rotation and extending between the parallel walls of the groove.

2. As an article of manufacture, a sheet metal sheave having a spider comprising a pair of opposed circular plates secured directly to each other at a plurality of points in an annular area between the center of the sheave and the rim thereof, with said plates having apertures at their center with oppositely disposed, arcuately shaped hub portions coacting to form a central ball race, and outwardly offset step portions extending to a pair of parallel side walls spaced apart from each other, together with a load member comprising a narrow annular ring interposed between said parallel side walls and seated on the outwardly offset step portions of said plates, with a smooth, cylindrical exterior surface on said ring perpendicular to the parallel side walls and coaxial with the axis of rotation of the sheave, whereby a cable running in the groove of said sheave bears only on a smooth face surface parallel to the axis of rotation and extending between the parallel walls of the groove.

3. As an article of manufacture, a sheet metal sheave having a spider comprising a pair of opposed circular plates secured directly to each other at a plurality of points in an annular area between the center of the sheave and the rim thereof, with said plates having parallel side walls spaced apart from each other and terminating in outwardly flared diverging flanges at the rim of the sheave, the parallel walls of said plates having corresponding opposed circular grooves in their inner surfaces with a load member comprising a narrow continuous annular ring seated in said grooves and secured therein between said parallel flange surfaces, with a smooth, unbroken cylindrical exterior surface on said ring perpendicular to the parallel side walls and coaxial with the axis of rotation of the sheave, whereby a cable running in the groove of said sheave bears only on a smooth, unbroken face surface parallel to the axis of rotation and extending between the parallel walls of the groove.

EDWARD N. HOWELL.

References Cited in the file of this patent

UNITED STATES PATENTS

| Number | Name | Date |
|---|---|---|
| 355,555 | Radford | Jan. 4, 1887 |
| 515,406 | Moore | Feb. 27, 1894 |
| 665,467 | Riblet | Jan. 8, 1901 |
| 2,315,357 | Smith | Mar. 30, 1943 |